United States Patent [19]
Hoyt et al.

[11] Patent Number: 5,812,839
[45] Date of Patent: Sep. 22, 1998

[54] DUAL PREDICTION BRANCH SYSTEM HAVING TWO STEP OF BRANCH RECOVERY PROCESS WHICH ACTIVATED ONLY WHEN MISPREDICTED BRANCH IS THE OLDEST INSTRUCTION IN THE OUT-OF-ORDER UNIT

[75] Inventors: Bradley D. Hoyt; Glenn J. Hinton, both of Portland; David B. Papworth; Ashwani Kumar Gupta, both of Beaverton; Michael Alan Fetterman, Hillsboro; Subramanian Natarajan; Sunil Shenoy, both of Portland; Reynold V. D'Sa, Aloha, all of Oreg.

[73] Assignee: Intel Corporation, Santa Clara, Calif.

[21] Appl. No.: 851,141

[22] Filed: May 5, 1997

Related U.S. Application Data

[63] Continuation of Ser. No. 638,093, Apr. 25, 1996, abandoned, which is a continuation of Ser. No. 176,785, Jan. 3, 1994, abandoned.

[51] Int. Cl.$^6$ ........................................................ G06F 9/38
[52] U.S. Cl. ........................................... 395/586; 395/582
[58] Field of Search ..................................... 395/580, 581, 395/582, 583, 584, 585, 586, 591, 587; 364/DIG. 1, DIG. 2

[56] References Cited

U.S. PATENT DOCUMENTS

| | | | |
|---|---|---|---|
| 4,750,112 | 6/1988 | Jones et al. | 395/375 |
| 4,853,840 | 8/1989 | Shibuya | 395/375 |
| 4,991,080 | 2/1991 | Emma et al. | 395/375 |

(List continued on next page.)

FOREIGN PATENT DOCUMENTS

| | | | |
|---|---|---|---|
| A-0229619 | 7/1987 | European Pat. Off. | G06F 9/38 |
| A-0463965 | 1/1992 | European Pat. Off. | G06F 9/38 |

OTHER PUBLICATIONS

D.R. Kaeli, et al., *Contrasting Instruction–Fetch Time and Instruction–Decode Time Branch Prediction Mechanisms: Achieving Synergy Through Their Cooperative Operation*, Microprocessing and MicroProgramming, pp. 401–408 (Sep. 1992).

D.J. Lilja, *Reducing the Branch Penalty in Pipelined Processors*, Computer, pp. 47–55 (Jul. 1988).

(List continued on next page.)

*Primary Examiner*—Meng-Ai T. An
*Attorney, Agent, or Firm*—Blakely, Sokoloff, Taylor & Zafman

[57] ABSTRACT

A four stage branch instruction resolution system for a pipelined processor is disclosed. A first stage of the branch instruction resolution system predicts the existence and outcome of branch instructions within an instruction stream such that an instruction fetch unit can continually fetch instructions. A second stage decodes all the instructions fetched. If the decode stage determines that a branch instruction predicted by the first stage is not a branch instruction, the decode stage flushes the pipeline and restarts the processor at a corrected address. The decode stage verifies all branch predictions made by the branch prediction stage. Finally, the decode stage makes branch predictions for branches not predicted by the branch prediction stage. A third stage executes all the branch instructions to determine a final branch outcome and a final branch target address. The branch execution stage compares the final branch outcome and final branch target address with the predicted branch outcome and predicted branch target address to determine if the processor must flush the front-end of the microprocessor pipeline and restart at a corrected address. A final branch resolution stage retires all branch instructions. The retirement stage ensures that any instructions fetched after a mispredicted branch are not committed into permanent state.

32 Claims, 7 Drawing Sheets

U.S. PATENT DOCUMENTS

| | | | |
|---|---|---|---|
| 5,072,364 | 12/1991 | Jardine et al. | 395/375 |
| 5,163,140 | 11/1992 | Stiles et al. | 395/425 |
| 5,226,126 | 7/1993 | McFarland et al. | 395/375 |
| 5,265,213 | 11/1993 | Weiser et al. | 395/375 |
| 5,353,421 | 10/1994 | Emma et al. | 395/375 |
| 5,367,703 | 11/1994 | Levitan | 395/800 |
| 5,414,822 | 5/1995 | Saito et al. | 395/375 |
| 5,442,756 | 8/1995 | Grochowski et al. | 395/585 |
| 5,448,705 | 9/1995 | Nguyen et al. | 395/375 |
| 5,463,745 | 10/1995 | Vidwans et al. | 395/375 |
| 5,465,336 | 11/1995 | Imai et al. | 395/375 |
| 5,487,156 | 1/1996 | Popesco et al. | 395/375 |
| 5,542,109 | 7/1996 | Blomgren et al. | 395/800 |
| 5,561,776 | 10/1996 | Popescu et al. | 395/586 |
| 5,592,636 | 1/1997 | Popescu et al. . | |
| 5,606,672 | 2/1997 | Grochowski et al. | 395/586 |
| 5,625,837 | 4/1997 | Popescu et al. | 395/800 |

OTHER PUBLICATIONS

Peleg, et al., *Future Trends in Microprocessors: Out–of–Order Execution, Speculative Branching and Their CISC Performance Potential,* 17th Convention of Electrical & Electronics Engineers in Israel, pp. 263–266 (Mar. 1991).

Torng, et al., *On Instruction Windowing for Fine Grain Parallelism in High–Performance Processors,* Phoenix Conference on Computers and Communication, pp. 98–104, (Mar. 1993).

Lightner, et al., *The Metaflow Lightning Chipset,* 36th Computer Society International Conference, pp. 13–18, (Feb. 1991).

Proceedings from The 19th Annual International Symposium on Computer Architecture, published 1992 by Association for Computing Machinery, New York, pp. 124–134, Entitled: Alternative Implementations of Two–Level Adaptive Branch Prediction, Authors: Tse–Yu Yeh and Yale N. Patt.

Publication: Computer, published Jan. 1984, pp. 6–22, Entitled: Branch Prediction Strategies and Branch Target Buffer Design, Authors: Johnny K.F. Lee, Hewlett–Packard and Alan Jay Smith, University of California, Berkeley.

Published by the Association for Computing Machinery, 1992, pp. 76–84, Entitled: Improving the Accuracy of Dynamic Branch Prediction Using Branch Correlation, Authors: Shien–Tai Pan and Kimming So, IBM Corp., and Joseph T. Rahmeh, University of Texas, Austin.

Published by the Association for Computing Machinery, 1991, pp. 51–61, Entitled: Two–Level Adaptive Training Branch Prediction, Authors: Tse–Yu Yeh and Yale N. Patt, University of Michigan.

Published by Prentice Hall, 1991, pp. 57–85, 261–273, Entitled: Superscalar Microprocessor Design, Author: Mike Johnson, Advanced Micro Devices.

IEEE Micro, Published Jun., 1991, pp. 10–13, and 63–73, Authors: Val Popescu, et al., Entitled: The Metaflow Architecture.

| BIT ENTRY NUMBER | FALL-THROUGH ADDRESS | PROCESSOR STATE INFORMATION |
|---|---|---|
| 0 | | |
| 1 | | |
| 2 | | |
| 3 | | |
| ⋮ | ⋮ | ⋮ |
| n-1 | | |

BRANCH INFORMATION TABLE (BIT)

DUAL PREDICTION BRANCH SYSTEM HAVING TWO STEP OF BRANCH RECOVERY PROCESS WHICH ACTIVATED ONLY WHEN MISPREDICTED BRANCH IS THE OLDEST INSTRUCTION IN THE OUT-OF-ORDER UNIT

This is a continuation of application Ser. No. 08/638,093, filed Apr. 25, 1996, now abandoned, which is a continuation of application Ser. No. 08/176/785, filed Jan. 3, 1994 abandoned.

FIELD OF THE INVENTION

This invention relates to the field of microprocessor architecture. Specifically, the invention relates to a branch instruction handling mechanism that resolves microprocessor branch instructions at four different stages in a microprocessor pipeline.

ART BACKGROUND

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waited until all the previous logic blocks complete operations before beginning its operation.

To improve efficiency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock tick the result of each processing stage is passed to the following processing stage. Microprocessors that use the technique of overlapping the fetch, decode, execute, and writeback stages are known as "pipelined" microprocessors. Some microprocessors further divide each processing stage into substages for additional performance improvement. Such processors are referred to as "deeply pipelined" microprocessors.

In order for a pipelined microprocessor to operate efficiently, an instruction fetch unit at the head of the pipeline must continually provide the pipeline with a stream of microprocessor instructions. However, conditional branch instructions within an instruction stream prevent the instruction fetch unit from fetching subsequent instructions until the branch condition is fully resolved. In a pipelined microprocessor, the branch condition will not be fully resolved until the branch instruction reaches an instruction execution stage near the end of the microprocessor pipeline. Accordingly, the instruction fetch unit will stall because the unresolved branch condition prevents the instruction fetch unit from knowing which instructions to fetch next.

To alleviate this problem, many pipelined microprocessors use branch prediction mechanisms that predict the existence and the outcome of branch instructions within an instruction stream. The instruction fetch unit uses the branch predictions to fetch subsequent instructions. For example, Yeh & Patt introduced a highly accurate two-level adaptive branch prediction mechanism. (See Tse Yu Yeh and Yale N. Patt, *Two-Level Adaptive Branch Prediction*, The 24th ACM/IEEE International Symposium and Workshop on Microarchitecture, November 1991, pp. 51–61) The Yeh & Patt branch prediction mechanism makes branch predictions based upon two levels of collected branch history.

When a branch prediction mechanism predicts the outcome of a branch instruction and the microprocessor executes subsequent instructions along the predicted path, the microprocessor is said to have "speculatively executed" along the predicted instruction path. During speculative execution the microprocessor is performing useful processing if the branch prediction mechanism made a correct prediction. However, if the branch prediction mechanism mispredicted the branch, the microprocessor is accomplishing nothing. When the microprocessor eventually detects a mispredicted branch, the microprocessor must flush the instruction pipeline and restart execution at the correct address.

Since the microprocessor accomplishes nothing when a misprediction is made, it is desirable to correct branch mispredictions as soon as possible such that the microprocessor can restart execution at the correct address as soon as possible. It is especially desirable to correct branch mispredictions quickly in deeply pipelined microprocessors where a long pipeline will be flushed each time a misprediction is made.

SUMMARY OF THE INVENTION

It is therefore an object of the present invention to provide a branch resolution mechanism that resolves microprocessor branch instructions at several different processing stages wherein each processing stage uses the information available to resolve the branch instruction.

It is a further object of the present invention to correct branch mispredictions as soon as possible so little processor time is spent speculatively executing down an incorrect path.

These and other objectives are accomplished by the four stage branch instruction resolution system for a pipelined processor of the present invention. A first stage predicts the existence and outcome of branch instructions within an instruction stream such that an instruction fetch unit can continually fetch instructions. A second stage decodes all the instructions fetched. If the decode stage determines that a supposed branch instruction predicted by the first stage is not actually a branch instruction, the decode stage flushes the pipeline and restarts the processor at a corrected address. The decode stage verifies all branch predictions made by the branch prediction stage. The decode stage makes branch predictions for branches not predicted by the branch prediction stage. A third stage executes the branch instruction to determine a final branch outcome and a final branch target address. The branch execution stage compares the final branch outcome and final branch target address with the predicted branch outcome and predicted branch target address to determine if the processor must flush the front-end of the microprocessor pipeline and restart at a corrected address. A final branch resolution stage retires all branch instructions. The retirement stage ensures that any instructions fetched after a mispredicted branch are not committed into permanent state.

BRIEF DESCRIPTION OF THE DRAWINGS

The objects, features and advantages of the present invention will be apparent to one skilled in the art, in view of the following detailed description and drawings in which:

FIG. 5 is a diagram of a Branch Instruction Pointer Table that stores information about the branch instructions currently within the microprocessor.

DETAILED DESCRIPTION OF THE INVENTION

A four stage branch prediction and resolution mechanism for a pipelined for microprocessor is disclosed. In the following description, for purposes of explanation, specific nomenclature is set forth to provide a thorough understanding of the present invention. However, it will be understood by one skilled in the art that these specific details are not required in order to practice the present invention. Furthermore, well known circuits and devices are shown in block diagram form in order not to obscure the present invention.

Figure 1:
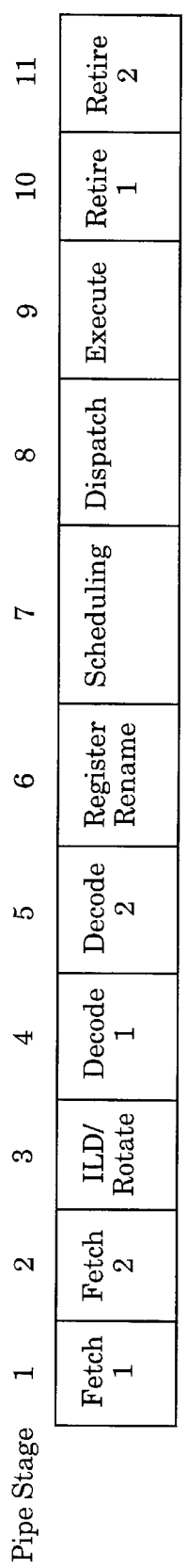
FIG. 1 is a block diagram of a deep microprocessor pipeline for processing microprocessor instructions.

In a deeply pipelined processor, the major stages of a pipelined processor such as instruction fetch, instruction decode, and instruction execute, are divided into several different substages such that each processing stage is pipelined. This results in a long instruction pipeline. For example, FIG. 1 illustrates a set of pipeline stages that defines one particular deeply pipelined processor. In the instruction pipeline of FIG. 1, the instruction processing is divided into 11 pipeline stages.

Four Stage Branch Instruction Processing

Figure 2:
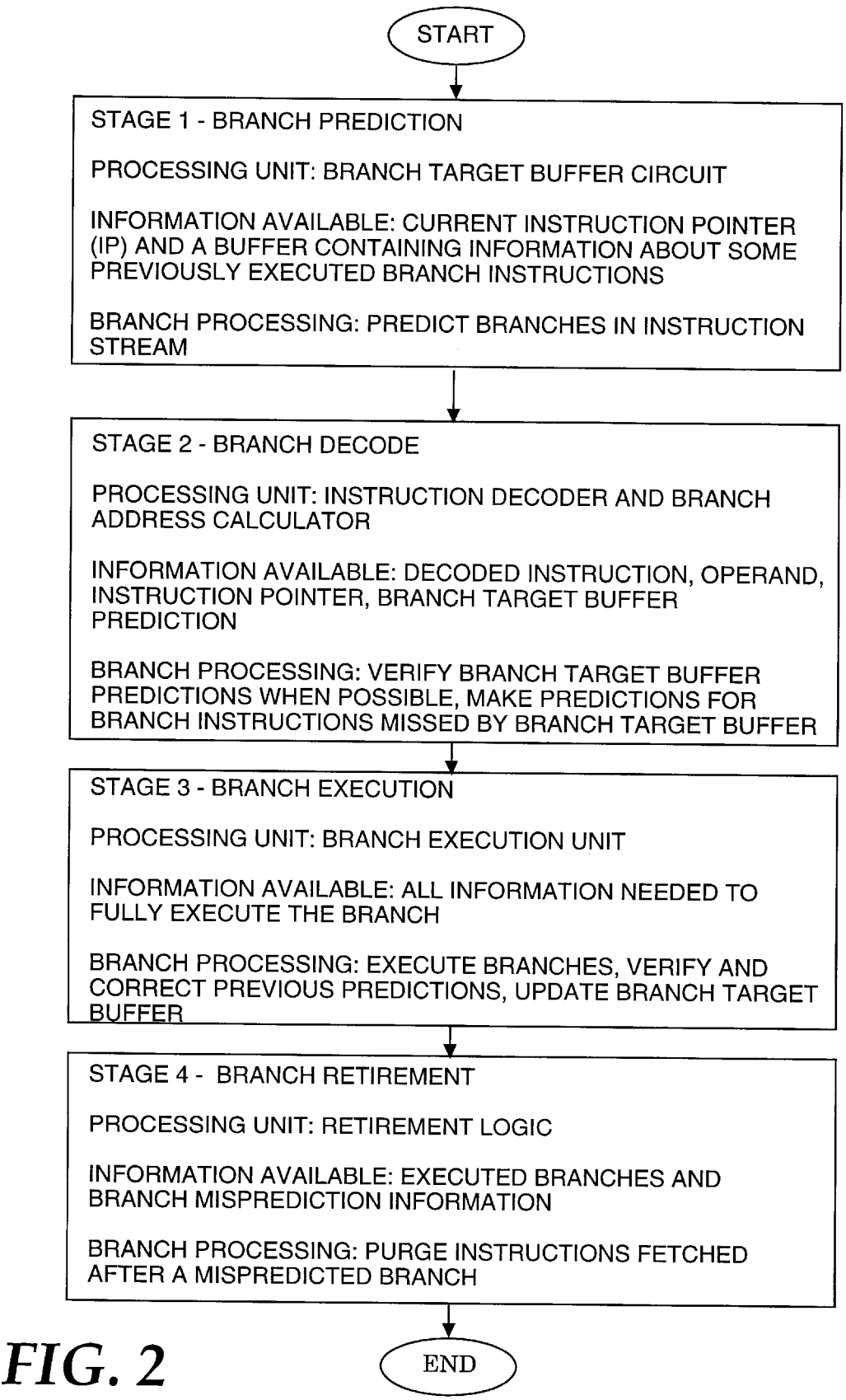
FIG. 2 is a flow diagram that explains the four stages of branch resolution the deep pipeline illustrated in FIG. 1.

To process branch instructions in a microprocessor containing a deep pipeline such as the pipeline illustrated in FIG. 1, the present invention proposes a four stage branch resolution mechanism. The goal of the four stage branch resolution mechanism is to predict and resolve branch instructions within the stream of microprocessor instructions. The four stage branch resolution mechanism first attempts to accurately predict the existence and outcome of each branch instruction within the stream of microprocessor instructions. The four stage branch resolution mechanism then attempts to resolve each predicted branch instruction as fast as possible such that the processor does not waste time speculatively executing instructions down a wrong path due to a branch misprediction. FIG. 2 illustrates the four branch resolution stages proposed by the present invention.

The first stage is a branch prediction stage. The branch prediction stage predicts the existence of branch instructions within the instruction stream. The branch prediction stage also predicts the outcome of the predicted branch instructions using only the current instruction pointer. By predicting the existence of branch instructions within the instruction stream, the microprocessor can fetch a stream of instructions without waiting for each instruction to execute.

The second stage of the branch resolution mechanism is a branch instruction decode stage. The branch instruction decode stage decodes each branch instruction and verifies the branch predictions made by the branch prediction stage. The branch instruction decode stage also makes branch predictions for branch instructions that were not predicted by the branch prediction stage. The branch instruction decode stage stores information about each branch instruction into a cache that will be accessed after the branch instruction is executed.

The third stage of the branch resolution mechanism is a branch execution stage. The branch execution stage executes each branch instruction such that a final branch outcome and a final branch target address are determined. If either of the two previous branch processing stages mispredicted a branch, the branch execution stage flushes the front-end of the microprocessor and causes the instruction execution unit to start fetching instructions from the corrected address.

The fourth and final stage of the four branch resolution mechanism is a branch retirement stage. The branch retirement stage is responsible for retiring each branch instruction and ensuring that no instructions fetched after a mispredicted branch are executed and committed into permanent state.

A Microprocessor With A Four Stage Branch Resolution Mechanism

Figure 3:
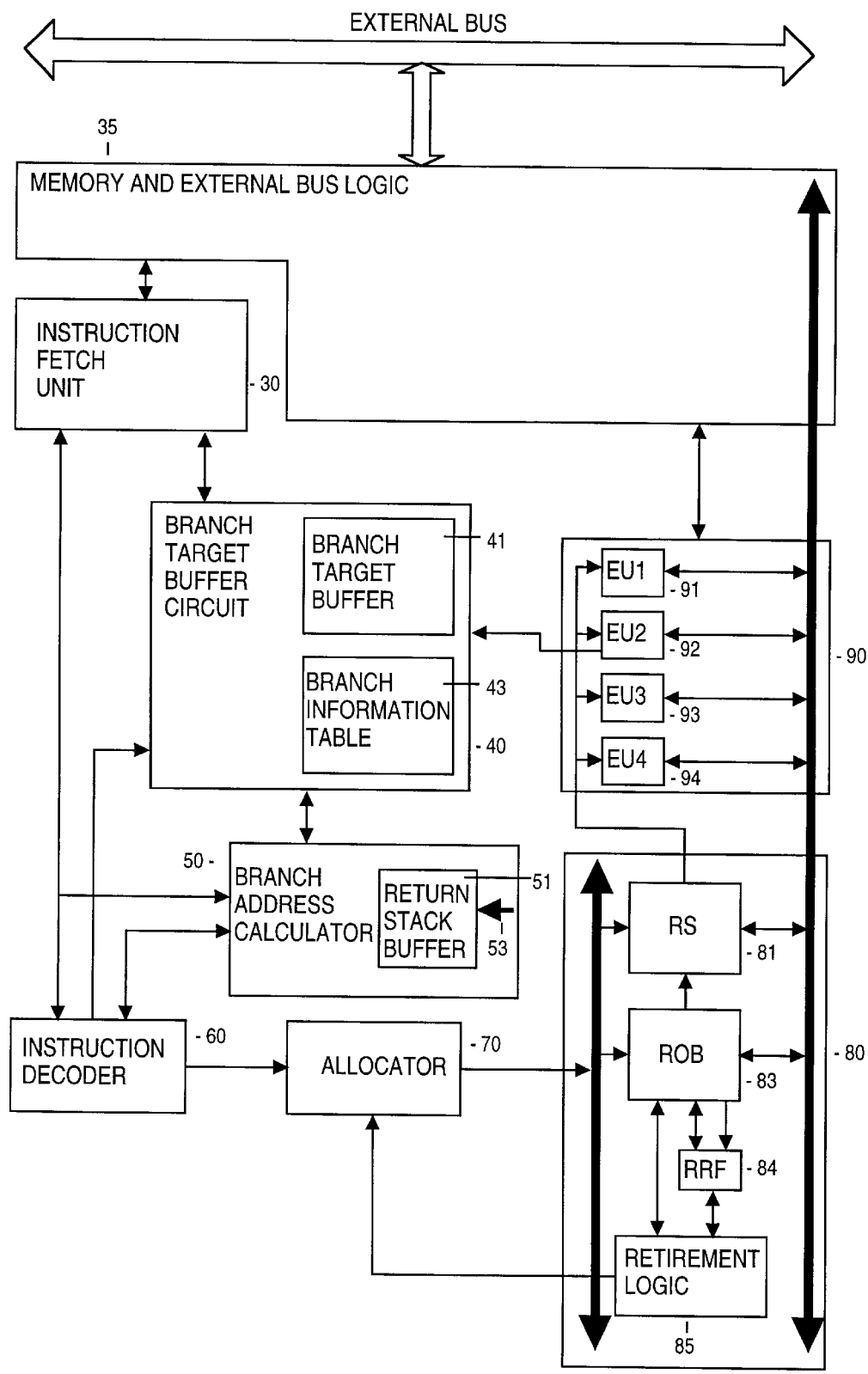
FIG. 3 is a block diagram of the different circuit blocks in a microprocessor that implements the deep pipeline illustrated in FIG. 1.

To implement the four stage branch resolution mechanism of FIG. 2, several distinct logic circuits are required. FIG. 3 illustrates, in block diagram form, the major logic circuits of a microprocessor that implements the deep pipeline illustrated in FIG. 1 and the four stage branch resolution mechanism of FIG. 2. In the microprocessor system depicted in FIG. 3, branch instructions are handled by four different logic circuits: the Branch Target Buffer 40, the Branch Address Calculator 50, the Branch Execution Unit (EU2) 92, and the Retirement Logic 85. In order to minimize pipeline stalls, each of those logic circuits uses the information that it has available to predict and resolve a branch instruction within the instruction stream. An overview of the microprocessor illustrated in FIG. 3 is provided and followed by a detailed description of each branch resolution stage.

At the top of the block diagram of FIG. 3 is Memory & Bus Logic 35. The Memory & Bus Logic 35 is responsible for loading information into the microprocessor and outputting information from the microprocessor. The Memory & Bus Logic 35 usually first attempts to load or store from a high speed cache memory (not shown). If the cache memory cannot be used (perhaps due to a cache "miss"), the Memory & Bus Logic 35 instead accesses a main memory over an external bus.

Coupled to the Memory & Bus Logic 35 is an Instruction Fetch Unit 30. The Instruction Fetch Unit 30 is responsible for continually fetching new microprocessor instructions (also known as macro instructions) and operands for the microprocessor to execute. The Instruction Fetch Unit 30 uses an instruction pointer (IP) to maintain the current fetch address. The fetched instructions are fed into the head of the instruction pipeline. Unconditional branch instructions within the instruction stream prevent the Instruction Fetch Unit 30 from fetching instructions along a sequential path. Furthermore, conditional branch instructions within the instruction stream prevent the Instruction Fetch Unit 30 from fetching instructions along a predefined path since the condition must be resolved to determine the path. To help fetch the correct instructions, the Instruction Fetch Unit 30 consults a Branch Target Buffer Circuit 40. The Branch Target Buffer Circuit 40 is a branch prediction mechanism and thus comprises the first stage of the four stage branch resolution mechanism. After fetching each instruction, the Instruction Fetch Unit 30 passes each instruction to an Instruction Decoder 60.

The Instruction Decoder 60 is responsible for determining what type of microprocessor instruction is received and breaking down the microprocessor instruction into one or more micro-operations (hereinafter referred to as micro-ops) with associated micro-operands. The one or more micro-ops corresponding to a microprocessor instruction perform the function of the corresponding microprocessor instruction. If the Instruction Decoder 60 determines that a received microprocessor instruction is a branch instruction, then the Instruction Decoder 60 passes certain information about the branch instruction to a Branch Address Calculator 50 for special treatment. The Branch Address Calculator 50 further processes each branch instruction using the information provided in the instruction and the operand. For example, if the Branch Target Buffer Circuit 40 made a branch prediction, the Branch Address Calculator 50 attempts to verify the branch prediction. Thus, the Instruction Decoder 60 and the Branch Address Calculator 50 form the second stage of the four stage branch resolution mechanism.

After breaking down the microprocessor instruction into a set of micro-ops, the Instruction Decoder 60 passes the micro-ops and associated operands to an Allocator 70. The Allocator 70 allocates the processor resources necessary to execute each micro-op. In the present embodiment, the microprocessor is a superscalar processor that may execute the micro-ops out of the original program order. However, the micro-ops eventually must be retired in the original program order to properly execute the computer program.

Figure 4:
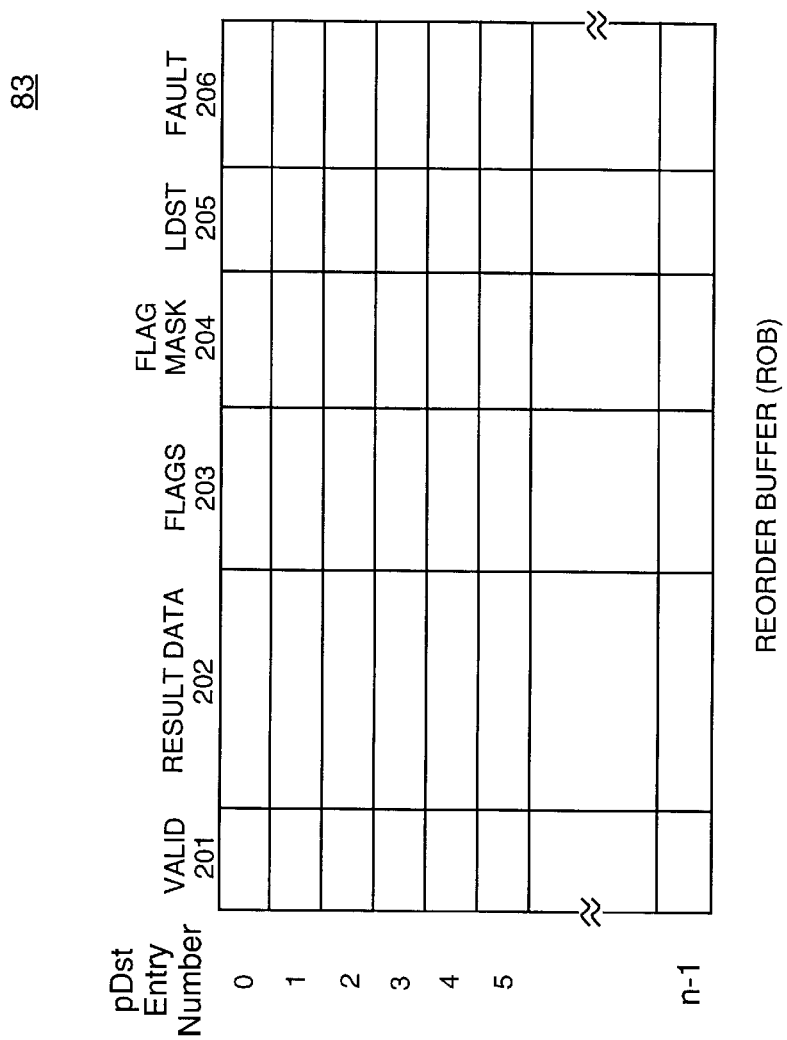
FIG. 4 is a diagram of a reorder buffer that stores the results of executed micro operations.

To maintain the original program order, the Allocator 70 allocates an entry in a reorder buffer (ROB) 83 in an Out of Order logic circuit 80. FIG. 4 illustrates a reorder buffer. The reorder buffer 83 of FIG. 4 comprises a circular buffer that contains n entries wherein each entry stores the results of executed micro-ops. Since each entry in the reorder buffer 83 provides a destination where the micro-op result data can physically be put, each reorder buffer 83 is referred to as a physical destination (pDst). The pDsts within the reorder buffer 83 are numbered 0 through n−1. Referring to FIG. 4, each pDst in the reorder buffer 83 contains fields for a valid bit that indicates whether or not the micro-op result is valid, a micro-op result, a set of flags affected by the micro-op, a mask for the flags, a code that indicates what the results mean, and fault data.

For each micro-op, the Allocator 70 allocates the next available pDst in the reorder buffer 83. By sequentially allocating the pDsts in the reorder buffer 83 in the same order that the micro-ops are received, the original program order of the micro-op results will be maintained.

When the Allocator 70 allocates a pDst in the reorder buffer 83 for a micro-op associated with a branch instruction, the Branch Target Buffer Circuit 40 allocates a matching entry in a cache called the Branch Instruction-Pointer Table (BIT) 43. The Branch Target Buffer Circuit 40 stores a "fall-through" address for the branch instruction and processor state information into the Branch Instruction-Pointer Table (BIT) 43. The fall-through address consists of the address of the instruction immediately following the branch instruction. The information stored in the Branch Instruction-Pointer Table (BIT) 43 is later used by the Instruction Fetch Unit 30, the Branch Address Calculator 50, and the Branch Target Buffer Circuit 40.

Referring back to FIG. 3, the Allocator 70 also allocates an entry in the reservation station 81 for each micro-op. The reservation station 81 entry stores a valid bit that indicates if the entry is valid, the micro-op instruction code, two source data fields, two valid bits for the source data fields, two physical source fields that indicate where the source data will come from if the source data is not valid, and a physical destination of the result of the micro-op. After the Allocator 70 allocates a reservation station entry and a pDst in the reorder buffer 83, each micro-op waits at the reservation station 81 entry until it is executed.

Each micro-op in a reservation station 81 entry remains at the reservation station 81 entry until all the source data required to execute the micro-op has been obtained and an execution unit for executing the micro-op is ready. When all the source data required for a micro-op is ready and an execution unit is available, the reservation station 81 dispatches the micro-op to the execution unit in the execution cluster 90. In the present embodiment, there are four execution units (EU1 91, EU2 92, EU3 93, and EU4 94) in the execution logic circuit 90. After an execution unit executes a micro-op, the execution unit writes the result data, the architectural flags, and any fault information into the reorder buffer 83 pDst that the Allocator 70 allocated for the micro-op.

In the present embodiment, execution unit 92 is designated as a Branch Execution Unit 92. The Branch Execution Unit 92 executes all branch micro-ops to determine the final branch outcome and the final branch target address. Thus the Branch Execution Unit 92 comprises the third stage of the branch resolution mechanism.

Finally, a Retirement Logic 85 retires the results that are stored in the reorder buffer 83 pDsts from each executed micro-op. The Retirement Logic 85 retires the Reorder Buffer 83 pDsts by sequentially going through the pDsts in the Reorder Buffer 83 in the same order that the Allocator 70 allocated the pDsts. The Retirement Logic 85 retires pDsts by transferring the micro-op results into a Real Register File (RRF) 84 that stores the current committed architectural state. Since the Allocator 70 allocated the reorder buffer 83 pDsts in original program order and the Retirement Logic 85 retires the micro-op results in the reorder buffer 83 pDsts in the same order, original program order is maintained even though micro-ops may be executed out of the original program order.

Referring to FIG. 4, to retire a micro-op, the Retirement Logic tests the valid bit 201 of a reorder buffer pDst entry to see if the pDst contains a valid executed micro-op result. If the valid bit 201 for the pDst is set, the Retirement Logic 85 checks the fault field 206 of the pDst to see if a fault must be handled. If the reorder buffer pDst entry contains a valid executed micro-op result and there is no fault problem, then the executed micro-op result is committed to permanent architectural state in the Real Register File (RRF) 84.

When the Retirement Logic 85 attempts to retire a branch micro-op, the Retirement Logic 85 tests the fault field 206 of the pDst entry to see if the branch micro-op was mispredicted. If Retirement Logic 85 detects that the micro-op was mispredicted, the Retirement Logic 85 flushes the remainder of the instructions in the reorder buffer 83 since those instructions were fetched after a branch misprediction. Thus the Retirement Logic 85 comprises the final stage of the four stage branch resolution mechanism.

Stage 1—The Branch Target Buffer Circuit

The first logic unit in the microprocessor depicted in FIG. 3 that works to resolve branch instructions is the Branch Target Buffer Circuit 40. Since the Branch Target Buffer Circuit 40 is at the very head of the instruction pipeline, the only piece of information the Branch Target Buffer Circuit 40 has to work with is the current instruction pointer (IP). The Branch Target Buffer Circuit 40 predicts the existence of branch instructions within the instruction stream, and the outcome of those branch instructions using only the current instruction pointer (IP) and an internal cache of information about branch instructions that have previously been executed.

To predict branch instructions, the Branch Target Buffer Circuit 40 maintains a buffer containing information about branch instructions that the microprocessor has previously executed. The buffer containing the branch information is referred to as the Branch Target Buffer Cache 41. Each time a branch instruction is resolved by the microprocessor, the Branch Target Buffer Circuit 40 records the branch target address and the outcome of the branch instruction in the Branch Target Buffer Cache 41 for future reference.

Each entry in the Branch Target Buffer Cache 41 is indexed by the address of the last byte of the branch instruction. Indexing each entry by the address of the last byte of the branch instruction allows the Branch Target Buffer Circuit 40 to look up a previously seen branch instruction using the instruction pointer. The Branch Target Buffer Circuit 40 makes branch predictions for previously executed branch instructions using the branch history collected within the Branch Target Buffer Cache 41.

When the Branch Target Buffer Circuit 40 finds an upcoming branch instruction in the Branch Target Buffer Cache 41, the Branch Target Buffer Circuit 40 predicts a taken or not-taken branch outcome for the branch instruction. If the Branch Target Buffer Circuit 40 predicts the branch instruction will be taken, then the Branch Target Buffer Circuit 40 also predicts a branch target address. A more detailed description of the Branch Target Buffer Circuit 40 can be found in the copending patent titled "Method and Apparatus for predicting Branches in a CISC processor", Ser. No. 08/177,155, filed Jan. 4,1994, U.S. Pat. No. 5,574,871 and is hereby incorporated by reference.

Stage 2—Instruction Decoding and the Branch Address Calculator

Referring to FIG. 3, after the Instruction Fetch Unit 30 fetches an instruction, the Instruction Fetch Unit 30 passes the instruction to the Instruction Decoder 60. When the Branch Target Buffer Circuit 40 predicts that a particular instruction is a branch instruction, the Instruction Fetch Unit 30 marks the instruction as a predicted branch and passes the marked branch instruction and the Branch Target Buffer Circuit's prediction to the Instruction Decoder 60.

The Instruction Decoder 60 decodes each microprocessor instruction received to determine what type of microprocessor instruction it is. The Instruction Decoder 60 breaks down each microprocessor instruction into one or more micro-operations (hereinafter referred to as micro-ops) with associated micro-operands. The one or more micro-ops corresponding to a microprocessor instruction perform the function of the corresponding microprocessor instruction.

If the Instruction Fetch Unit 30 passes an instruction that is marked as a predicted branch instruction, the Instruction Decoder 60 verifies that the received instruction actually is a branch instruction. When the Branch Target Buffer Circuit 40 predicts a branch instruction at a location were no branch instruction exists, it is referred to as a "bogus" branch. The Branch Target Buffer Circuit 40 occasionally predicts bogus branches due to outdated information or aliasing caused by compressed tags in the Branch Target Buffer Cache 41.

If the Instruction Decoder 60 determines that the Branch Target Buffer Circuit 40 predicted a "bogus" branch, then the Instruction Decoder 60 notifies the Branch Address Calculator 50. The Branch Address Calculator 50 flushes the microprocessor pipeline if the predicted branch instruction was predicted taken. To prevent the same misprediction from occurring again, the Branch Address Calculator 50 instructs the Branch Target Buffer Circuit 40 to deallocate the Branch Target Buffer Cache 41 entry that made the misprediction.

If the Instruction Decoder 60 determines that the received microprocessor instruction is a branch instruction, then the Instruction Decoder 60 passes certain information about the branch instruction to a Branch Address Calculator 50 for special treatment. Specifically, the Instruction Decoder 60 tells the Branch Address Calculator 50 what type of branch instruction has been received, the branch's displacement, and the Branch Target Buffer Circuit's outcome and target address prediction.

The branch instruction may be one of four types of branch instructions: Unconditional Relative Jump/Call, Unconditional Register Indirect Jump/Call, Conditional Jump, or Return from Subroutine. Each type of branch instruction is handled differently by the Branch Address Calculator 50. The Branch Address Calculator 50 also handles each type of branch instruction differently depending if the Branch Target Buffer Circuit 40 predicted the existence of the branch instruction or not. The following Table 1 illustrates how the Branch Address Calculator 50 handles each type of branch instruction when the Branch Target Buffer Circuit 40 predicted the branch instruction and the Instruction Decoder 60 verified that the predicted branch instruction actually is a branch instruction. (As stated earlier, if the Instruction Decoder 60 determines that a predicted branch instruction is not a branch instruction, then the Branch Address Calculator 50 flushes the microprocessor pipeline)

TABLE 1

| | Branch Address Calculator Action | |
|---|---|---|
| Branch (As decoded by ID) | Validation of the BTB Branch Outcome | Validation of the Branch Target Address |
| Unconditional Relative Jump or Call | Yes, taken | Yes, target calculated from IP and branch displacement |
| Register indirect Jump or Call | Yes, taken | No, just use BTB address prediction |
| Conditional Jump | No, condition unknown | Yes, target calculated from IP and branch displacement |
| Return from subroutine | Yes, taken | Yes, from BAC return stack buffer |

When the Branch Address Calculator 50 receives an Unconditional Relative Jump or Call instruction that was predicted by the Branch Target Buffer Circuit 40, the Branch Address Calculator 50 validates both the predicted branch outcome and the predicted branch target address. Since the branch is unconditional, the Branch Target Buffer Circuit 40 validates the branch outcome by ensuring the branch was predicted taken. The Branch Address Calculator 50 validates the branch target address by calculating the Instruction Pointer relative target address and comparing the calculated branch target address to the predicted branch target address. If either the branch outcome or branch target address were mispredicted, the Branch Address Calculator 50 flushes the pipeline and restarts the machine at the corrected address. Since the Branch Address Calculator 50 fully validates both the predicted branch outcome and the predicted branch target address for Unconditional Relative Jump or Call instructions, such branch instructions are fully executed. Thus, the Branch Execution Unit will not need to perform any work on such instructions.

When the Branch Address Calculator 50 receives an Unconditional Register Indirect Jump or Call instruction that was predicted by the Branch Target Buffer Circuit 40, the Branch Address Calculator 50 validates the predicted branch outcome. Since the branch is unconditional, the Branch Address Calculator 50 validates the predicted branch outcome by ensuring the branch instruction was predicted taken. The Branch Address Calculator 50 cannot validate the branch target address since the value within the register is not known at this stage in the microprocessor pipeline. The Branch Address Calculator 50, therefore, makes no adjustment to the branch target address predicted by the Branch Target Buffer Circuit 40. The Branch Execution Unit must verify the branch target address predicted by the Branch Target Buffer Circuit 40.

When the Branch Address Calculator 50 receives a Conditional Jump instruction that was predicted by the Branch Target Buffer Circuit 40, the Branch Address Calculator 50 validates only the branch target address. The Branch Address Calculator 50 validates the branch target address by calculating the branch target address and comparing the calculated branch target address with the predicted branch target address. The Branch Address Calculator 50 does not validate the branch outcome since the outcome of branch condition is not known at this stage in the pipeline.

When the Branch Address Calculator 50 receives a Return from Subroutine instruction that was predicted by the Branch Target Buffer Circuit 40, the Branch Address Calculator 50 validates both the predicted branch outcome and the predicted branch target address. Since a Return from Subroutine instruction is unconditional, the Branch Target Buffer Circuit 40 validates the branch outcome by ensuring the branch instruction was predicted taken. The Branch Address Calculator 50 validates the branch target address by accessing a buffer called the Return Stack Buffer 51.

The Return Stack Buffer 51 operates by monitoring all "Call subroutine" and "Return from subroutine" branch instructions. When the Branch Address Calculator 50 detects a "Call subroutine" branch instruction, the Branch Address Calculator 50 pushes the address of the next instruction onto the Return Stack Buffer 51. A Top of Stack Pointer 53 marks the top of the Return Stack Buffer 51. By pushing the address immediately following each "Call subroutine" instruction onto the Return Stack Buffer 51, the Return Stack Buffer 51 will contain a stack of return addresses. When the Branch Address Calculator 50 later detects a "Return from subroutine" branch instruction, the Branch Address Calculator 50 pops the top return address off of the Return Stack Buffer 51 to verify the return address predicted by the Branch Target Buffer Circuit 40. A detailed description of the Return Stack Buffer 51 is provided in the copending patent application "Method and Apparatus for Resolving Return From Subroutine Instructions in Computer Processor", Ser. No. 08/176,065, Jan. 4, 1994, U.S. Pat. No. 5,604,877 and is hereby incorporated by reference.

If the microprocessor encounters a branch instruction that the microprocessor has never seen or a branch instruction that had corresponding data purged from the Branch Target Buffer Cache 41, the Branch Target Buffer Circuit 40 will not predict the branch instruction. The following Table 2 illustrates how the Branch Address Calculator 50 handles each type of branch instruction when the Branch Target Buffer Circuit 40 did not predict the branch instruction but the Instruction Decoder 60 determined that the instruction is a branch instruction.

TABLE 2

| Branch Type | Branch Address Calculator Action | |
|---|---|---|
| (As decoded by Instruction Decoder) | Branch Outcome Prediction/Calculation | Branch Target Address Prediction/Calculation |
| IP Relative Jump or Call | Taken, since unconditional branch | Calculated from IP and branch displacement |
| Register Indirect Jump or call | Taken, since unconditional branch | Predict next sequential address |
| Conditional jump (backward) | Predict taken | Calculate from IP and branch displacement |
| Conditional jump (forward) | Predict not taken | Calculate from IP and branch displacement |
| Return from subroutine | Taken, since unconditional branch | Pop return address off of return stack buffer |

As stated in Table 2, when the Branch Address Calculator 50 receives an Unconditional Relative Jump or Call instruction that was not predicted by the Branch Target Buffer Circuit 40, the Branch Address Calculator 50 calculates both a branch outcome and branch target address. The Branch Address Calculator 50 sets the branch outcome as taken for Unconditional Relative Jump or Call instructions. The Branch Address Calculator 50 calculates the branch target address using the Instruction Pointer and the branch displacement provided by the branch instruction. The Branch Address Calculator 50 then flushes the microprocessor pipeline and restarts the machine at the calculated branch target address. Thus, the Branch Address Calculator 50 effectively fully executes Unconditional Relative Jump or Call instructions.

When the Branch Address Calculator 50 receives an Unconditional Register Indirect Jump or Call instruction that was not predicted by the Branch Target Buffer Circuit 40, the Branch Address Calculator 50 only predicts the branch outcome as taken. The Branch Address Calculator 50 cannot calculate a final branch target address since the value of the register is not known at this stage in the microprocessor pipeline. The Branch Address Calculator 50 simply predicts the branch target address to be the next sequential address since the Instruction Fetch Unit 30 has already been fetching those instructions. An intelligent compiler that knows of this propensity can make the next sequential address the most frequently used branch target address in Unconditional Register Indirect Jump or Call instructions.

When the Branch Address Calculator 50 receives a Conditional Jump instruction that was not predicted by the Branch Target Buffer Circuit 40, the Branch Address Calculator 50 predicts both a branch outcome and a branch target address. The Branch Address Calculator 50 calculates the branch target address using the Instruction Pointer and the branch displacement provided by the branch instruction. The Branch Address Calculator 50 predicts the branch outcome based upon whether the branch instruction jumps backward or forward.

If the Conditional Jump instruction jumps backward, then the Branch Address Calculator 50 predicts the branch outcome of branch instruction as taken. The Branch Address Calculator 50 therefore flushes the instruction pipeline and resumes execution at the calculated branch target address when a backward Conditional Jump instruction is detected.

If the Conditional Jump instruction jumps forward, then the Branch Address Calculator 50 predicts the branch outcome of branch instruction as not-taken. Although the branch target address may not be needed, the Branch Address Calculator 50 still calculates the branch target address since it will be needed if the Branch Address Calculator 50 mispredicts the branch instruction.

When the Branch Address Calculator 50 receives a Return from Subroutine instruction that was not predicted by the Branch Target Buffer Circuit 40, the Branch Address Calculator 50 predicts both a branch outcome and a branch target address. Since a Return from Subroutine instruction is an unconditional branch, the Branch Target Buffer Circuit 40 predicts the branch outcome for the branch instruction as taken. The Branch Address Calculator 50 predicts the branch target address by popping off a return address off of the Return Stack Buffer 51. Since the return address predicted by the Branch Address Calculator 50 may be wrong, the Branch Execution Unit 92 must later verify the predicted return address.

After the Branch Address Calculator 50 completes its calculations, the Branch Address Calculator 50 returns the processed branch information to the Instruction Decoder 60. The Instruction Decoder 60 passes the instruction to an Allocator 70. When the Instruction Decoder 60 passes the branch micro-op to the Allocator 70, the Allocator 70 assigns the next available pDst entry in the reorder buffer 83 to store the results of the branch micro-op.

When the Allocator 70 allocates a pDst in the reorder buffer 83 for a micro-op associated with a branch instruction, the Branch Target Buffer Circuit 40 allocates a matching entry in a cache called the Branch Instruction-Pointer (IP) Table 43 using the same pDst entry number. The Instruction Decoder 60 then writes information about the branch instruction into the assigned entry in the Branch IP Table 43. Specifically, the Instruction Decoder 60 writes a fall-through address and processor state information into the assigned entry in the Branch IP Table 43.

FIG. 5 illustrates the Branch IP Table 43 of the present invention. The Branch IP Table 43 comprises a buffer containing n branch information entries (0 to n −1) wherein n equals the number of entries in the Reorder Buffer 83. Each branch information entry within the Branch IP Table 43 comprises a fall-through address field and a processor state information field.

The fall-through address field of the Branch IP Table 43 stores the address of the instruction that follows the branch instruction associated with the branch micro-op. The Instruction Fetch Unit 30 uses the fall-through address when a branch is mispredicted as taken when the branch should not have been taken. The fall-through address is also used as an index for the Branch Target Buffer Cache 41 when updating the Branch Target Buffer Cache 41 with new information. When updating the Branch Target Buffer Cache 41 with new information, the fall-through address is decremented by one to produce the address of the last byte of the branch instruction. The Branch Target Buffer Circuit 40 uses the decremented fall-through address value (the address of the last byte of the branch instruction) as an index for the Branch Target Buffer Cache 41.

The processor state information field of the Branch IP Table 43 is used to store any state information that may be corrupted when the microprocessor begins speculative execution after making a branch prediction. If the microprocessor is speculatively executing down the wrong path due to a branch misprediction, the microprocessor state information can be restored from the Branch IP Table 43 when the misprediction is detected. In the present embodiment, the microprocessor state information field stores a Top of Stack pointer from the Branch Address Calculator 50.

The branch information stored in the Branch IP Table 43 is later accessed after the associated branch micro-op has executed. More information about the Branch IP Table 43 can be found in the copending application patent application "Method and Apparatus for a Branch Instruction Pointer Table", Ser. No. 08/176,795, filed Jan. 3, 1994 now abandoned.

Stage 3—The Branch Execution Unit

When all the data required to execute a branch micro-op waiting in the reservation station 81 is available, the reservation station 81 issues the branch micro-op to the Branch Execution Unit 92. The Branch Execution Unit 92 is responsible for fully executing branch micro-ops such that the Branch Execution Unit 92 determines the final branch outcome (taken or not taken) and the final branch target address.

The Branch Target Buffer Circuit 40 monitors the bus used to send branch micro-ops from the reservation station 81 to the branch execution unit 92. When the Branch Target Buffer Circuit 40 notices the reservation station 81 issued a branch micro-op to the branch execution unit 92, the Branch Target Buffer Circuit 40 notes which pDst entry number in the reorder buffer 83 will be used to store the branch micro-op result. While the Branch Execution Unit 92 executes the branch micro-op, the Branch Target Buffer Circuit 40 reads out the entry in the Branch IP Table 43 having the same entry number as the reorder buffer 83 entry. In this manner, the branch information associated with the branch micro-op being executed will be available when the branch micro-op is resolved. Specifically, the fall-through address for the branch instruction is available such that the microprocessor can restart at the fall-through address if the branch instruction was mispredicted as taken.

To keep the Branch Target Buffer Cache 41 updated, the Branch Execution Unit 92 usually passes the final branch outcome and the branch target address information to the Branch Target Buffer Circuit 40 so the Branch Target Buffer Circuit 40 can update the Branch Target Buffer Cache 41. However, if an older mispredicted branch has been detected, the Branch Execution Unit 92 does not pass the final branch outcome and the branch target address information to the Branch Target Buffer Circuit 40 since the branch instruction was executed during speculative execution down a wrong path.

The Branch Execution Unit 92 compares the final branch outcome and correct branch target address with the predicted branch outcome and branch target address to determine if the branch was predicted correctly or mispredicted. If the branch instruction was predicted correctly by the Branch Target Buffer Circuit 40 or the Branch Address Calculator 50, then the microprocessor continues execution along the current path. If the branch instruction was mispredicted, then the Branch Execution Unit 92 will likely flush the front-end of the microprocessor and restart the microprocessor at the correct address. However, if there was an older mispredicted branch that already caused the Branch Execution Unit 92 to flush the front-end of the microprocessor, the Branch Execution Unit 92 will not flush the microprocessor again. The handling of mispredicted branches is explained in greater detail after the following explanation of how the Branch Execution Unit 92 processes each type of branch instruction.

Executing Branch Instructions

The following Table 3 illustrates how the Branch Execution Unit 92 executes each type of branch instruction.

TABLE 3

| Branch Type | Branch Execution Unit Action | |
| --- | --- | --- |
| | Calculation of Branch Outcome | Calculation of Branch Target Address |
| Relative Jump or Call | No action needed | No action needed |
| Register indirect Jump or Call | No action needed | Target address from address pointed to by register operand |
| Conditional Jump | Yes, from flags | No action needed |
| Return from subroutine | No action needed | Target address from architectural stack |

As stated in Table 3, the Branch Execution Unit 92 need not perform any processing on Relative Jump or Call instructions. The Branch Execution Unit 92 performs no processing on Relative Jump or Call instructions since the Branch Address Calculator 50 already fully executed those types of branch instructions. If there is no older mispredicted branch, the Branch Execution Unit 92 passes the final branch outcome and the branch target address to the Branch Target Buffer Circuit 40 so the Branch Target Buffer Circuit 40 can update the Branch Target Buffer Cache 41.

To execute Register Indirect Jump or Call instructions, the Branch Execution Unit 92 obtains the value of the register designated in the operand and then gets the final branch target address from a branch table using the register value. The Branch Execution Unit 92 passes the branch target address to the Branch Target Buffer Circuit 40 so the Branch Target Buffer Circuit 40 can update the Branch Target Buffer Cache 41. The Branch Execution Unit 92 compares the final target address with the predicted target address to determine if the Branch Target Buffer Circuit 40 correctly predicted the branch. If the branch was predicted correctly, execution continues along the current path. However, if the Branch Target Buffer Circuit 40 mispredicted the branch, then the Branch Execution Unit 92 must flush the pipeline and restart the processor unless there is an older nonretired mispredicted branch.

To execute a Conditional Jump micro-op, the Branch Execution Unit 92 tests the designated condition to determine the branch outcome. The branch target address does not need to be resolved since the Branch Address Calculator 50 has fully calculated the target address. The Branch Execution Unit 92 determines the branch outcome by obtaining the current architectural flags and tests for the designated flag. The branch outcome is then compared with the prediction made by the Branch Target Buffer Circuit 40. If the Branch Target Buffer Circuit 40 correctly predicted the branch, then execution continues along the current path. However, if the Branch Target Buffer Circuit 40 mispredicted the branch, then the Branch Execution Unit 92 must restart the pipeline unless there is an older nonretired mispredicted branch. In either case, the Branch Execution Unit 92 then determines if there is an older mispredicted branch. If there is no older mispredicted branch, the Branch Execution Unit 92 passes the final branch outcome and the final branch target address to the Branch Target Buffer Circuit 40 so the Branch Target Buffer Circuit 40 can update the Branch Target Buffer Cache 41.

The Branch Execution Unit 92 executes Return from Subroutine micro-ops by popping the top value off of the architectural stack of the microprocessor. The Branch Execution Unit 92 then compares the value popped off the top of the architectural stack with the return address predicted by the Return Stack Buffer 51 in the Branch Address Calculator 50. If the two addresses match, the microprocessor continues execution along the current path. However, if the two address do not match, the Branch Execution Unit 92 must flush and restart the microprocessor pipeline unless there is an older nonretired mispredicted branch.

Handling Mispredicted Branch Instructions

When the Branch Execution Unit 92 executes a branch micro-op and determines that the branch was mispredicted by the Branch Target Buffer Circuit 40 or the Branch Address Calculator 50, the Branch Execution Unit 92 usually flushes the front-end of the microprocessor (the Instruction Fetch Unit 30 to the Allocator 70), stalls the Allocator 70, and restarts the Instruction Fetch Unit 30 at the corrected address. However, if Branch Execution Unit 92 recently flushed the pipeline due to an older nonretired mispredicted branch, the Branch Execution Unit 92 should not flush the pipeline again. Thus the Branch Execution Unit 92 should only flush the pipeline if the mispredicted branch is the oldest nonretired mispredicted branch. This concept is presented clearly using FIGS. 6a through 6d that illustrate 4 possible branch misprediction situations.

Figure 6A:
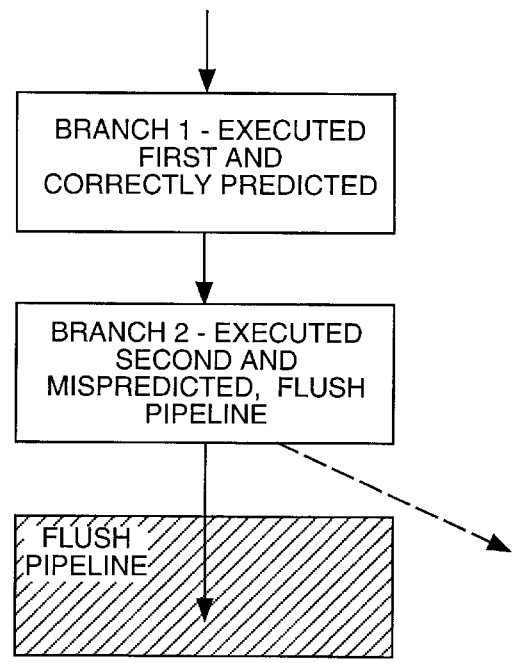
FIG. 6a is a diagram illustrating how the branch execution unit handles a correctly predicted first branch followed by a mispredicted second branch.

Referring to FIG. 6a, there are two branches that occur sequentially in the computer code: Branch 1 and Branch 2. In the example of FIG. 6a, Branch 1 is executed first and was predicted correctly. Next, Branch 2 is executed and the Branch Execution Unit 92 determines that Branch 2 was mispredicted. Since the Branch Execution Unit 92 determines that Branch 2 is the oldest nonretired mispredicted branch, it marks Branch 2 as mispredicted and performs the full branch misprediction recovery procedure.

The full branch misprediction recovery procedure consists of simultaneously stalling the Allocator 70, flushing the front-end of the microprocessor, and restarting the Instruction Fetch Unit 30 at the corrected branch target address. The Branch Execution Unit 92 stalls the Allocator 70 such that the Allocator 70 will not allocate reorder buffer entries or reservation station entries. By stalling the Allocator 70, the Branch Execution Unit 92 prevents any new instructions in the front-end of the processor from entering the Out-Of-Order section 80 of the microprocessor. The Branch Execution Unit 92 flushes the front-end of the microprocessor (the Instruction Fetch Unit 30 to the Allocator 70) such that all the instructions in the front-end of the microprocessor that were fetched after the branch misprediction are discarded. (Note that other instructions that were fetched after the branch misprediction may still be in the Out-Of-Order section 80 of the microprocessor or in other execution units.) The Branch Execution Unit 92 restarts the Instruction Fetch Unit 30 at the corrected branch target address.

Figure 6B:
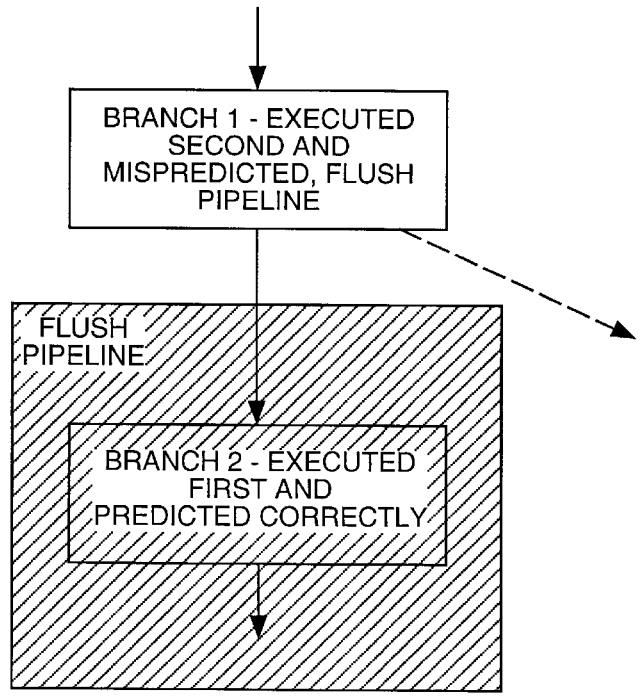
FIG. 6b is a diagram illustrating how the branch execution unit handles a correctly predicted second branch followed by a mispredicted first branch.

FIG. 6b presents the situation where the second branch (Branch 2) is executed first and was predicted correctly; and the first branch (Branch 1) is executed second (out-of-order) and was mispredicted. In this situation, the Branch Execution Unit 92 determines that Branch 1 is the oldest nonretired mispredicted branch and therefore marks Branch 1 as mispredicted and performs the full branch misprediction recovery procedure.

Figure 6C:
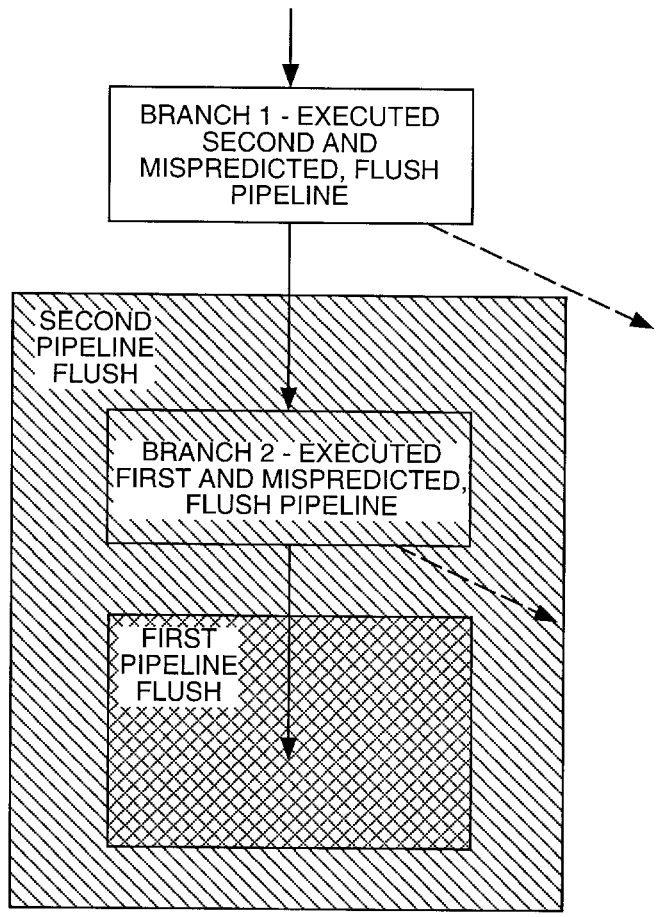
FIG. 6c is a diagram illustrating how the branch execution unit handles a mispredicted second branch followed by a mispredicted first branch.

FIG. 6c presents the situation where the second branch (Branch 2) is executed first and was mispredicted; and the first branch (Branch 1) is executed second (out-of-order) and was also mispredicted. When the Branch Execution Unit 92 first executes Branch 2, the Branch Execution Unit 92 determines that Branch 2 is the oldest nonretired mispredicted branch and therefore marks Branch 2 as mispredicted and performs the full branch misprediction recovery procedure on Branch 2 to start fetching instructions at a corrected target address. (Note that Branch 1 is not the oldest nonretired mispredicted branch when Branch 2 is executed because Branch 1 has not yet been executed.) After executing Branch 2, the Branch Execution Unit 92 then executes Branch 1 and determines that Branch 1 has been mispredicted. Since Branch 1 is older than Branch 2 (Branch 1 occurs first in the program order), Branch 1 is the oldest nonretired mispredicted branch. Thus, the Branch Execution Unit 92 again performs the full branch misprediction recovery procedure to start fetching instructions at a corrected target address.

Figure 6D:
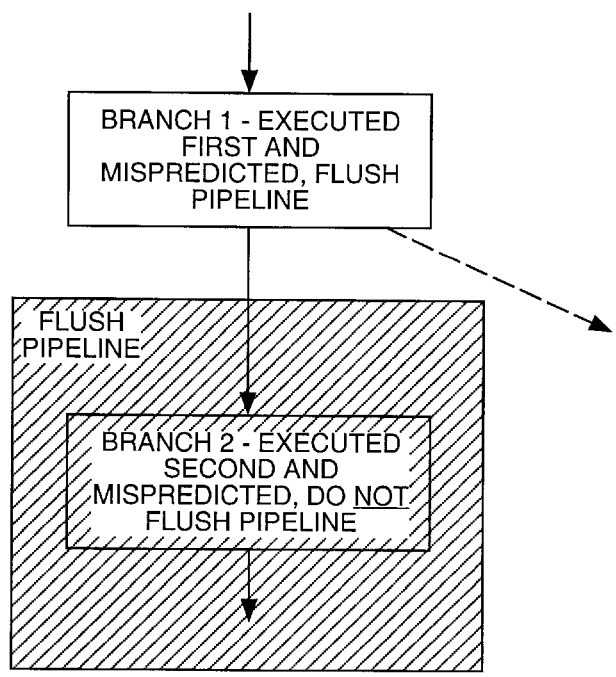
FIG. 6d is a diagram illustrating how the branch execution unit handles a mispredicted first branch followed by a mispredicted second branch.

FIG. 6d presents the situation where the first branch (Branch 1) is executed first and was mispredicted; and the second branch (Branch 2) is executed second and was also mispredicted. When the Branch Execution Unit 92 executes Branch 1, the Branch Execution Unit 92 determines that Branch 1 is the oldest nonretired mispredicted branch. The Branch Execution Unit 92 therefore marks Branch 1 as mispredicted and performs the full branch misprediction recovery procedure. Next, when the Branch Execution Unit 92 executes Branch 2, the Branch Execution Unit 92 determines that Branch 2 is not the oldest nonretired mispredicted branch since Branch 1 is an older nonretired mispredicted branch. Thus, the Branch Execution Unit 92 does not perform the branch misprediction recovery procedure. Furthermore, the Branch Execution Unit 92 does not send branch outcome or branch target address information to the Branch Target Buffer Circuit 40 since the Branch 2 should not have executed. Note that if the Branch Execution Unit 92 performed the branch misprediction recovery procedure, the microprocessor would have started executing the wrong instructions since Branch 2 itself never should have been executed.

Thus, in summary, the Branch Execution Unit 92 executes all branches to determine the final branch outcome and the final branch target address of each branch. The final branch outcome and final branch target address are compared with the branch outcome and branch target address predicted by the Branch Target Buffer Circuit 40 or the Branch Address Calculator 50. When the Branch Execution Unit 92 detects a mispredicted branch, the Branch Execution Unit 92 tests to see if the mispredicted branch is the oldest nonretired mispredicted branch. If the mispredicted branch is the oldest nonretired mispredicted branch, the Branch Execution Unit 92 flushes the entire front end of the microprocessor, restarts the front-end of the microprocessor at the correct address, and prevents any new micro-ops from entering the out-of-order section 80 of the microprocessor by stalling the Allocator 70.

Stage 4—The Retirement Logic

The final stage in branch resolution is performed by the Retirement Logic 85. The Retirement Logic 85 is responsible for retiring the micro-ops executed by the execution units in the microprocessor. The Retirement Logic 85 prevents instructions fetched after mispredicted branches from being committed into permanent state.

As stated in the previous section, when the Branch Execution Unit 92 detects a mispredicted branch that is the oldest nonretired mispredicted branch, the Branch Execution Unit 92 flushes the entire front end of the microprocessor. However, there may be number of instructions fetched after the branch misprediction that are still in the microprocessor. Other instructions that were fetched after the branch misprediction may still reside in other execution units or in the reservation station 81 and reorder buffer 83. To prevent these instructions that never should have been fetched from being committed into permanent architectural state, the Retirement Logic 85 flushes these remaining instructions when a mispredicted branch micro-op retires.

To flush the micro-ops corresponding to instructions fetched after a mispredicted branch that remain in the microprocessor, the Retirement Logic 85 clears all the entries in the reorder buffer 83 that follow the reorder buffer 83 entry containing the mispredicted branch micro-op when the mispredicted branch micro-op retires. After clearing all the reorder buffer 83 entries after the reorder buffer 83 entry containing the mispredicted branch micro-op, the Retirement Logic 85 restarts the Allocator 70 that was stalled when the Branch Execution Unit 92 detected the mispredicted branch. By restarting the Allocator 70, the Branch Execution Unit 92 allows the new micro-ops from instructions that were fetched using the corrected fetch address to enter Out-of-order section 80 of the microprocessor.

For example, referring to FIG. 3 and FIG. 6b, when the Branch Execution Unit 92 executes Branch 2, the results are stored into the reorder buffer 83. Next, when the Branch Execution Unit 92 executes Branch 1, the Branch Execution Unit 92 flushes the front end of the machine thereby clearing the Instruction Fetch Unit 30, the Instruction Decoder 60, the Branch Address Calculator 50, and the Allocator 70. However, Branch 2 (an instruction fetched after the mispredicted Branch 1) remains in the Reorder Buffer 83. When the Retirement Logic 85 retires Branch 1, the Retirement Logic 85 notices that Branch 1 was mispredicted. Since Branch 1 has been mispredicted, the Retirement Logic 85 clears all the reorder buffer 83 entries after the mispredicted Branch 1. Thus Branch 2 is cleared from the microprocessor and it never affects the microprocessor's permanent architectural state.

The foregoing has described a four stage branch instruction resolution mechanism. It is contemplated that changes and modifications may be made by one of ordinary skill in the art, to the materials and arrangements of elements of the present invention without departing from the scope of the invention.

We claim:

1. A instruction processing pipeline system, said instruction processing system resolving branch instructions within a stream of computer instructions, said instruction processing pipeline system comprising of:

a branch instruction prediction mechanism, said branch instruction prediction mechanism predicting a subset of said branch instructions included in said stream of computer instructions;

an instruction decode mechanism, said instruction decode mechanism coupled to said branch instruction prediction mechanism, said instruction decode mechanism decoding said branch instructions;

an out-of order instruction execution mechanism, said out-of order instruction execution mechanism coupled to said instruction decode mechanism, said out-of order instruction execution mechanism executing said branch instructions out of an original program order, said out-of order branch instruction execution mechanism flushing at least said branch instruction prediction mechanism and said instruction decode mechanism when said out-of order instruction execution mechanism detects a mispredicted branch instruction that is the oldest mispredicted branch instruction in said out-of order execution mechanism; and an instruction retirement mechanism, said instruction retirement mechanism coupled to said out-of order branch instruction execution mechanism, said instruction retirement mechanism retiring instructions to architectural state in an original program order, said instruction retirement mechanism flushing said out-of-order instruction execution mechanism when said instruction retirement mechanism detects a mispredicted branch.

2. The instruction processing pipeline system as claimed in claim 1 wherein said branch instruction prediction mechanism predicts a branch outcome and a branch target address for each branch instruction in said subset of said branch instructions.

3. The instruction processing pipeline system as claimed in claim 2 wherein said branch instruction prediction mechanism predicts said subset of said branch instructions using a branch target buffer.

4. The instruction processing pipeline system as claimed in claim 2 wherein said instruction decode mechanism verifies the branch prediction made by said branch instruction prediction mechanism.

5. The instruction processing pipeline system as claimed in claim 4 wherein said instruction decode mechanism makes branch predictions for branch instructions not predicted by said branch instruction prediction mechanism.

6. The instruction processing pipeline system as claimed in claim 1 wherein said out-of order instruction execution mechanism executes said branch instructions from said stream of computer instructions and determines a final branch outcome and a final branch target address.

7. The instruction processing pipeline system as claimed in claim 6 wherein said out-of order instruction execution mechanism coupled to said branch instruction prediction mechanism and said out-of order instruction execution mechanism updates said branch instruction prediction mechanism with said final branch outcome and said final branch target address.

8. The instruction processing pipeline system as claimed in claim 7 wherein said branch instruction prediction mechanism updates said branch target buffer with said final branch outcome and said final branch target address received from said out-of order instruction execution mechanism.

9. A method of resolving branch instructions in a computer processor, said method comprising the steps of:

predicting a subset of said branch instructions included a stream of computer instructions in an instruction fetch unit such that said computer processor can continually fetch said stream of computer instructions;

decoding said branch instructions in a decoder to determine a branch type and a branch operand;

executing said branch instructions out of an original program order in an out-of-order unit to calculate a final branch outcome and a final branch target address for each branch instruction;

flushing at least said instruction fetch unit and said decoder when said out-of-order unit detects a mispredicted branch instruction that is the oldest mispredicted branch instruction in said out-of order unit;

retiring said instructions in an original program order with a retirement unit to commit a result of said instructions into a permanent state if said branch instructions are not mispredicted; and flushing said out-of-order unit when said retirement unit detects said mispredicted branch instruction.

10. The method of resolving branch instructions in a computer processor as claimed in claim 9 wherein said step of predicting a subset of said branch instructions within a stream of computer instructions comprises predicting a branch outcome and a branch target address for each branch instruction in said subset of said branch instructions.

11. The method of resolving branch instructions in a computer processor as claimed in claim 10 wherein said step of decoding said branch instructions further comprises verifying the branch predictions made by said step of predicting a subset of said branch instructions.

12. The method of resolving branch instructions in a computer processor as claimed in claim 11 wherein said step of decoding said branch instructions further comprises predicting a branch outcome and a branch target address for branch instructions not predicted by said step of predicting a subset of said branch instructions.

13. The method of resolving branch instructions in a computer processor as claimed in claim 9 wherein said step of predicting a subset of said branch instructions is performed using a branch target buffer.

14. The method of resolving branch instructions in a computer processor as claimed in claim 13 wherein said step of executing said branch instructions further comprises updating said branch target buffer with said final branch outcome sand said final branch target address.

15. The method of resolving branch instructions in a computer processor as claimed in claim 9 wherein said step of flushing said out-of-order unit comprises flushing all instructions in said computer processor fetched after mispredicted branch instruction and fetched before flushing said instruction fetch unit and said decoder.

16. A branch instruction processing pipeline system, said branch instruction processing pipeline system resolving branch instructions within a stream of computer instructions, said branch instruction processing pipeline system comprising:

a branch instruction prediction mechanism, said branch instruction prediction mechanism predicting a subset of said branch instructions included in said stream of computer instructions, said branch instruction prediction mechanism generating a predicted branch outcome and a predicted branch target address for said subset of said branch instructions;

a branch instruction decode mechanism, said branch instruction decode mechanism decoding said stream of computer instructions, said branch instruction decode mechanism generating a predicted branch outcome and a predicted branch target address for branch instructions not within said subset of said branch instructions predicted by said branch instruction prediction mechanism;

an out-of-order branch instruction execution mechanism, said out-of-order branch instruction execution mechanism executing said branch instructions to determine a final branch outcome and a final branch target address for each of said branch instructions, said out-of-order branch instruction execution mechanism compares said final branch outcome and said final branch target address with said predicted branch outcome and said predicted branch target address for each branch instruction to determine branch mispredictions, said out-of-order branch instruction execution mechanism flushing at least said branch instruction prediction mechanism and branch instruction decode mechanism when a mispredicted branch is detected that is the oldest mispredicted branch instruction in said out-of order branch instruction execution mechanism; and a branch instruction retirement mechanism, said branch instruction retirement mechanism retiring said branch instructions executed by said out-of-order branch instruction execution mechanism in an original program order, said branch instruction retirement mechanism flushing only said out-of-order branch instruction execution mechanism when said branch instruction retirement mechanism detects said mispredicted branch.

17. The branch instruction processing pipeline system as claimed in claim 16 wherein said out-of-order branch instruction execution mechanism flushes said branch instruction prediction mechanism and said branch instruction decode mechanism only if a mispredicted branch is an oldest nonretired mispredicted branch instruction in said out-of-order branch instruction execution mechanism.

18. A computer processor, said computer processor comprising the elements of:
a front-end unit, said front-end unit comprising:
an instruction fetch unit, said instruction fetch unit fetching a stream of computer instructions into said computer processor, said stream of computer instructions including branch instructions;
a branch instruction prediction mechanism, said branch instruction prediction mechanism predicting a subset of said branch instructions within said stream of computer instructions;
an instruction decode mechanism, said instruction decode mechanism decoding said stream of computer instructions;
an allocator, said allocator allocating resources needed to execute said stream of computer instructions;
an out-of order scheduling unit, said out-of-order scheduling unit scheduling said stream of computer instructions including branch instructions for out-of-order execution;
at least one instruction execution unit, said instruction execution unit executing said stream of computer instructions out of an original program order, said instruction execution unit flushing only a set of computer instructions in said front-end unit if said execution unit detects a mispredicted branch instruction that is the oldest nonretired mispredicted branch instruction in computer processor; and
an instruction retirement unit, said instruction retirement unit coupled to said out-of order scheduling unit, said instruction retirement unit detecting mispredicted branch instructions, said instruction retirement unit flushing all computer instructions in said out-of-order scheduling unit fetched after a mispredicted branch instruction when said execution unit detects said mispredicted branch instruction.

19. A computer processor, said computer processor comprising:
means for predicting a subset of branch instructions within a stream of computer instructions such that said computer processor can continually fetch said stream of instructions;
means for decoding said stream of computer instructions, said means for decoding said stream of computer instructions determining a branch type and a branch operand for branch instructions within said stream of computer instructions;
a reorder buffer for storing decoded computer instructions;
means for executing said decoded computer instructions including branch instructions out of an original program order, said means for executing said stream of computer instructions calculating a final branch outcome and a final branch target address for branch instructions within said stream of computer instructions to determine if branch instructions are mispredicted, said means for executing flushing only said means for predicting and said means for decoding when a branch instruction is mispredicted that is the oldest mispredicted branch instruction in said reorder buffer; and
means for retiring said stream of computer instructions in said original program order, said means for retiring said computer instructions flushing all instructions stored in said reorder buffer that were fetched after an executed mispredicted branch instruction.

20. The computer processor as claimed in claim 19 wherein said means for predicting a subset of said branch instructions within a stream of computer instructions predicts a branch outcome and a branch target address for each branch instruction in said subset of said branch instructions.

21. The computer processor as claimed in claim 20 wherein said means for decoding said stream of computer instructions verifies the branch predictions made by said means for predicting a subset of said branch instructions.

22. The computer processor as claimed in claim 20 wherein said means for decoding said stream of computer instructions predicts a branch outcome and a branch target address for branch instructions not predicted by said means for predicting a subset of said branch instructions.

23. The computer processor as claimed in claim 19 wherein said means for predicting a subset of said branch instructions comprises a branch target buffer.

24. The computer processor as claimed in claim 23 wherein said means for executing said stream of computer instructions updates said branch target buffer with said final branch outcome and said final branch target address.

25. A pipelined processor, said pipelined processor comprising:
an in-order fetch unit, said in-order fetch unit predicting branch instructions;
a decode unit, said decode unit coupled to said in-order fetch unit;
an out-of-order execution unit coupled to the decode unit and the in-order fetch unit, said out-of-order execution unit executing computer instructions including branch instructions out of an original program order, said out-of order execution unit flushing only said in-order fetch unit and said decode unit when a mispredicted branch instruction is detected that is the oldest nonretired mispredicted branch instruction in said pipelined processor;
an in-order retirement unit coupled to the out-of-order execution section, said in-order retirement unit for retiring computer instructions executed by said out-of-order execution unit; and
a mispredicted branch recovery unit, said mispredicted branch recovery unit coupled to said in-order retirement unit and said out-of-order execution unit, said mispredicted branch recovery unit flushing said out-of-order execution unit when a mispredicted branch instruction is detected by said in-order retirement unit.

26. The pipelined processor claim 25 wherein the mispredicted branch recovery unit ignores a mispredicted branch instruction if the mispredicted branch instruction is determined to have been executed as a result of an earlier mispredicted branch.

27. A method of operation by a processor which has a multi-stage pipeline including an in-order fetch stage, a decode stage, an out-of-order execution stage, and an in-order retirement stage, and which executes instructions in a program according to the pipeline, the method comprising the ordered steps of:

predicting a target address of a first branch instruction;

fetching instructions from the predicted target address;

determining that the first branch was mispredicted during said execution stage;

flushing instructions fetched from the predicted target address from the in-order fetch stage and decode stage when the first branch is the oldest branch instruction in said out-of-order execution stage;

identifying a correct target address of the first branch instruction;

fetching instructions at the correct target address;

flushing instructions fetched from the predicted target address from the out-of-order execution stage when the first branch instruction reaches the in-order retirement stage; and executing the instructions fetched at the correct target address.

28. The method of claim 27 further comprising, after the step of determining that the first branch was mispredicted, the steps of:

determining whether there is a second mispredicted branch in said execution stage that was fetched prior to said first branch in the program; and skipping said step of flushing instructions fetched from the predicted target address from the out-of-order execution stage for said first branch if said second mispredicted branch exists.

29. The method of claim 27 wherein the step of flushing instructions fetched from the predicted target address from the in-order fetch stage and decode stage and the step of identifying a correct target address are performed simultaneously.

30. A computer apparatus, said computer apparatus comprising:

an in-order fetch unit, said in-order fetch unit including means for predicting a target address of a branch instruction;

a decode unit coupled to said in-order fetch unit;

an out-of-order execution unit coupled to the decode unit, said out-of-order execution unit comprising
means for determining if the target address was mispredicted;

means for flushing only the in-order fetch unit and decode unit when a mispredicted branch is the oldest nonretired branch instruction in said computer apparatus;

means for identifying a correct branch target address of the branch instruction;

means for preventing instructions from the correct branch target address from proceeding from the in-order fetch and decode section to the out-of-order execution section until the branch instruction is ready for retirement;

an in-order retirement unit coupled to the out-of-order execution unit, said in-order retirement unit including
means for flushing all in-process instructions from the out-of-order execution section; and means, responsive to the means for flushing all in-process instructions from the out-of-order execution section, for permitting instructions to proceed from the in-order fetch and decode section to the out-of-order execution section.

31. An improved method of recovering from branch misprediction in a processor which performs out-of-order execution, wherein the improvement comprises the steps of:

fetching a first branch instruction from a program;

predicting a first target address for said first branch instruction;

speculatively fetching a second branch instruction from the program, responsive to the prediction of the first target address of the first branch instruction, wherein the said second branch instruction is subsequent to the first branch instruction according to an order of the program;

predicting a second target address for said second branch instruction;

speculatively executing the second branch instruction out-of-order, before the first branch instruction;

determining that the second target address of the second branch instruction was mispredicted; and recovering from the misprediction of the second branch instruction, even though it is not yet known whether the first branch was mispredicted since said second branch is the oldest nonretired mispredicted branch instruction.

32. The improved method of claim 31 further comprising:

determining that the first branch instruction was also mispredicted and that the second branch instruction should not have been executed, before completion of the process to recover from the misprediction of the second branch instruction; and aborting the step of recovering from the misprediction of the second branch instruction.

* * * * *